United States Patent
Daily et al.

(10) Patent No.: US 8,335,751 B1
(45) Date of Patent: Dec. 18, 2012

(54) SYSTEM FOR INTELLIGENT GOAL-DIRECTED SEARCH IN LARGE VOLUME IMAGERY AND VIDEO USING A COGNITIVE-NEURAL SUBSYSTEM

(75) Inventors: Michael J. Daily, Thousand Oaks, CA (US); Deepak Khosla, Camarillo, CA (US); Ronald T. Azuma, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 532 days.

(21) Appl. No.: 12/589,052

(22) Filed: Oct. 15, 2009

Related U.S. Application Data (63) Continuation-in-part of application No. 12/316,779, filed on Dec. 16, 2008.

(51) Int. Cl.
| | |
|---|---|
| *G06F 15/18* | (2006.01) |
| *G06F 17/00* | (2006.01) |
| *G06F 17/20* | (2006.01) |
| *G06E 1/00* | (2006.01) |
| *G06E 3/00* | (2006.01) |
| *G06G 7/00* | (2006.01) |
| *G06K 9/62* | (2006.01) |

(52) U.S. Cl. .............. 706/14; 706/11; 706/20; 382/155; 382/156

(58) Field of Classification Search .................. None
See application file for complete search history.

(56) References Cited

U.S. PATENT DOCUMENTS

2010/0185113 A1* 7/2010 Peot et al. .................... 600/544

OTHER PUBLICATIONS

Gerson, A.D.; Parra, L.C.; Sajda, P.; , "Cortically coupled computer vision for rapid image search," Neural Systems and Rehabilitation Engineering, IEEE Transactions on , vol. 14, No. 2, pp. 174-179, Jun. 2006.*

Yonghong Huang; Erdogmus, D.; Mathan, S.; Pavel, M.; , "Large-scale image database triage via EEG evoked responses," Acoustics, Speech and Signal Processing, 2008. ICASSP 2008. IEEE International Conference on , vol., no., pp. 429-432, Mar. 31, 2008-Apr. 4, 2008.*

A. Cowell, K. Hale, C. Berka, S. Fuchs, A. Baskin, D. Jones, G. Davis, R. Johnson, R. Fatch. Construction and Validation of a Neurophysio-technological Framework for Imagery Analysis. Human-Computer Interaction. Interaction Platforms and Techniques, vol. 4551, pp. 1096-1055, 2007.*

Gerson, Parra, Sajada, "Cortically-coupled computer vision for rapid image search," IEEE Trans. on Neural Systems and Rehabilitation Engineering, Jun. 2006.

* cited by examiner

Primary Examiner — Kakali Chaki
Assistant Examiner — Daniel Pellett
(74) Attorney, Agent, or Firm — Tope-McKay & Associates (57) ABSTRACT

A system for intelligent goal-directed search in large volume visual imagery using a cognitive-neural subsystem is disclosed. The system comprises an imager, a display, a display processor, a cognitive-neural subsystem, a system controller, and operator controls. The cognitive-neural subsystem comprises a cognitive module, a neural module, and an adaptation module. The cognitive module is configured to extract a set of regions of interest from the image using a cognitive algorithm. The neural module is configured to refine the set of regions of interest using a neural processing algorithm. The adaptation module is configured to bias the cognitive algorithm with information gained from the neural module to improve future searches. The system functions in a plurality of operating modes, including: batch mode, semi-interactive mode, real-time mode, and roaming mode.

15 Claims, 4 Drawing Sheets

SYSTEM FOR INTELLIGENT GOAL-DIRECTED SEARCH IN LARGE VOLUME IMAGERY AND VIDEO USING A COGNITIVE-NEURAL SUBSYSTEM

PRIORITY CLAIM

This application is a Continuation-in-Part application of U.S. patent application Ser. No. 12/316,779, filed on Dec. 16, 2008, and titled "COGNITIVE-NEURAL METHOD FOR IMAGE ANALYSIS."

BACKGROUND OF THE INVENTION (1) Field of Invention

The present invention relates to searching visual imagery and, more specifically to a system for intelligent goal-directed search in large volume visual imagery using a cognitive-neural subsystem.

(2) Description of Related Art

The present invention relates to video image analysis. Previous methods of video image analysis fall into two categories: human vision and computer vision. Human vision methods locate regions of interest by systematically or randomly manually scanning the fovea (narrow fields of view) over the image area. In the case of a magnifying optical system such as binoculars, the human manually scans the optical system over a wider field of view (FOV). For an expert in surveillance and reconnaissance this can take over 5 minutes for a 120 degree FOV region. Furthermore, this process is limited in range by the effective optical magnification of the system. Humans are also more likely to make errors during prolonged or difficult tasks due to fatigue.

Recently the field has seen the emergence of neural or "brain-in-the-loop" image analysis methods which analyze static, previously-acquired imagery using electroencephalography (EEG). These neural methods are limited to sequential presentation of pre-selected image chips followed by manual inspection, and are also limited by human fatigue during long presentation sessions.

Computer vision methods, on the other hand, have been developed to automatically detect objects of interest based on large numbers of sample training data. These computer vision methods are prone to error and typically useful only in previously known conditions and for previously determined small numbers of objects of interest.

A small number of previous methods have used human neural methods that are based on the Rapid Serial Visual Processing (RSVP) paradigm. RSVP is often referred to as an oddball task since the brain elicits a particular response to a novel stimulus. This response is called the P300 response and occurs 300 milliseconds after stimulus. In an RSVP method, images of a specified target object of interest and background distractor images not containing the target are both captured and stored. The target objects typically must comprise no more than 25% of the image area, be large enough to be visible, be placed near the center of fixation, and be interspersed at a pre-specified rate. Being interspersed at a pre-specified rate typically requires far fewer target images than distractor images (e.g., 2 per 100, called the target probability), as well as proper interspersing of the target, called the target-to-target interval. RSVP then presents images to the operator at a rate 5 to 10 images per second. Single trial EEG recordings at specific scalp locations are made and processed using simple linear pattern classifiers or multiple classifier systems. These classifiers must be trained on large numbers of representative data similar to the data to be analyzed, and over varying time window intervals (e.g., 2500 sample images, with 50 target images and 2450 non-target images). In practical situations, RSVP approaches require the user to focus on flashing images for 20 to 30 seconds or more, depending on how many regions of interest exist in the image sequence. These existing RSVP approaches are not capable of inspecting live imagery, and do not support the use of Cognitive algorithms in the system architecture.

Thus, a continuing need exists for a cognitive-neural system for large volume image analysis which incorporates both human and computer components and is capable of analyzing live and stored imagery.

SUMMARY OF INVENTION

The present invention relates to searching visual imagery and, more specifically to a system for intelligent goal-directed search in large volume visual imagery using a cognitive-neural subsystem. One aspect of the system comprises an imager, a display, a display processor, a cognitive-neural subsystem, a system controller, and operator controls. The imager is configured to produce an image of a scene. The display is configured for displaying the image to an operator. The display processor is configured to assemble the image and control an appearance of the image as seen by the operator on the display. The cognitive-neural subsystem is configured to locate regions of interest in the image. The cognitive-neural subsystem comprises a cognitive module and a neural module. The cognitive module is configured to extract a set of regions of interest from the image using a cognitive algorithm. The neural module is configured to refine the set of regions of interest using a neural processing algorithm. Furthermore, the operator controls are configured to allow the operator to select from a plurality of operating modes and to navigate the displayed image. Finally, the system controller is configured to control system states and power usage, and to manage interfaces between the imager, display, display processor, cognitive-neural subsystem, and operator controls.

In another aspect, the cognitive neural subsystem further comprises an adaptation module configured to bias the cognitive algorithm with information gained from the neural processing algorithm.

In yet another aspect, the system is mounted in a pair of binoculars.

In a further aspect, the system is configured to operate in a batch mode. In batch mode, portions of an image containing a potential region of interest are pre-selected using the cognitive algorithm. The pre-selected portions of the image are then displayed to the operator using Rapid Serial Visual Presentation (RSVP). An operator response to the pre-selected portion of the image is measured using Electro-encephalography (EEG). When the pre-selected portion of the image yields a high EEG response, the portion is presented to the operator for operator-controlled visual inspection and validation.

In another aspect of the present invention, the system is configured to operate in a semi-interactive mode. In semi-interactive mode, a portion of an image containing a potential region of interest is pre-selected using the cognitive algorithm. The user is then presented with a reduced-resolution image where the pre-selected portion of the image is highlighted. The operator's gaze is tracked using eye-tracking, such that when the operator's gaze crosses the pre-selected portion of the image, the portion is displayed in a full resolution view for visual inspection by the operator. An operator response to the pre-selected portion of the image is measured using Electro-encephalography (EEG). The pre-selected portion of the image is validated if it triggers a high EEG response.

In yet another aspect, the system is configured to operate in a real-time mode. In real time mode, the operator is presented with an image for visual inspection. The operator's gaze is tracked using eye-tracking. A portion of the image is extracted based on the location of the operator's gaze. The extracted portion of the image is processed using the cognitive algorithm to identify whether the portion contains a potential region of interest. The extracted portion of the image containing potential regions of interest is then presented to the operator for visual inspection. An operator response to the extracted portion of the image is measured using Electro-encephalography (EEG). When the extracted portion of the image triggers a high EEG response, the portion is marked and stored for later validation. The stored portion of the image can then be presented to the operator for operator-controlled visual inspection and validation.

In a further aspect, the system is configured to operate in a roaming mode. In roaming mode, the operator is presented with an image for visual inspection. The operator's gaze is tracked using eye-tracking. A portion of the image is extracted based on the location of the operator's gaze. An operator response to the extracted portion of the image is measured using Electro-encephalography (EEG). When the portion of the image triggers a high EEG response, the portion the portion is marked and stored for later validation. The stored portion of the image can then be presented to the operator for operator-controlled visual inspection and validation.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to searching visual imagery and, more specifically to a system for intelligent goal-directed search in large volume visual imagery using a cognitive-neural subsystem. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Further, if used, the labels left, right, front, back, top, bottom, forward, reverse, clockwise and counter clockwise have been used for convenience purposes only and are not intended to imply any particular fixed direction.

Instead, they are used to reflect relative locations and/or directions between various portions of an object.

(1) LIST OF CITED REFERENCES

The following references are cited throughout this application. For clarity and convenience, the references are listed herein as a central resource for the reader. The following references are hereby incorporated by reference as though fully included herein. The references are cited in the application by referring to the corresponding literature reference number.

[1] Thorpe, S., Fize, D., and Marlot, C, (1996), "Speed of processing in the human visual system", Nature, 381: 520-522.

[2] Gerson, Parra, Sajda, "Cortically-coupled Computer Vision for Rapid Image Search," IEEE Trans. On Neural Systems and Rehabilitation Engineering, June 2006.

[3] Y. Owechko and S. Medasani (2005), "A Swarm-Based Volition/Attention Framework for Object Recognition," IEEE Conference on Computer Vision and Pattern Recognition, San Diego.

[4] Y. Owechko and S. Medasani (2005), "Cognitive Swarms for Rapid Detection of Objects and Associations in Visual Imagery," IEEE Swarm Intelligence Symposium.

(2) DESCRIPTION

Figure 1:
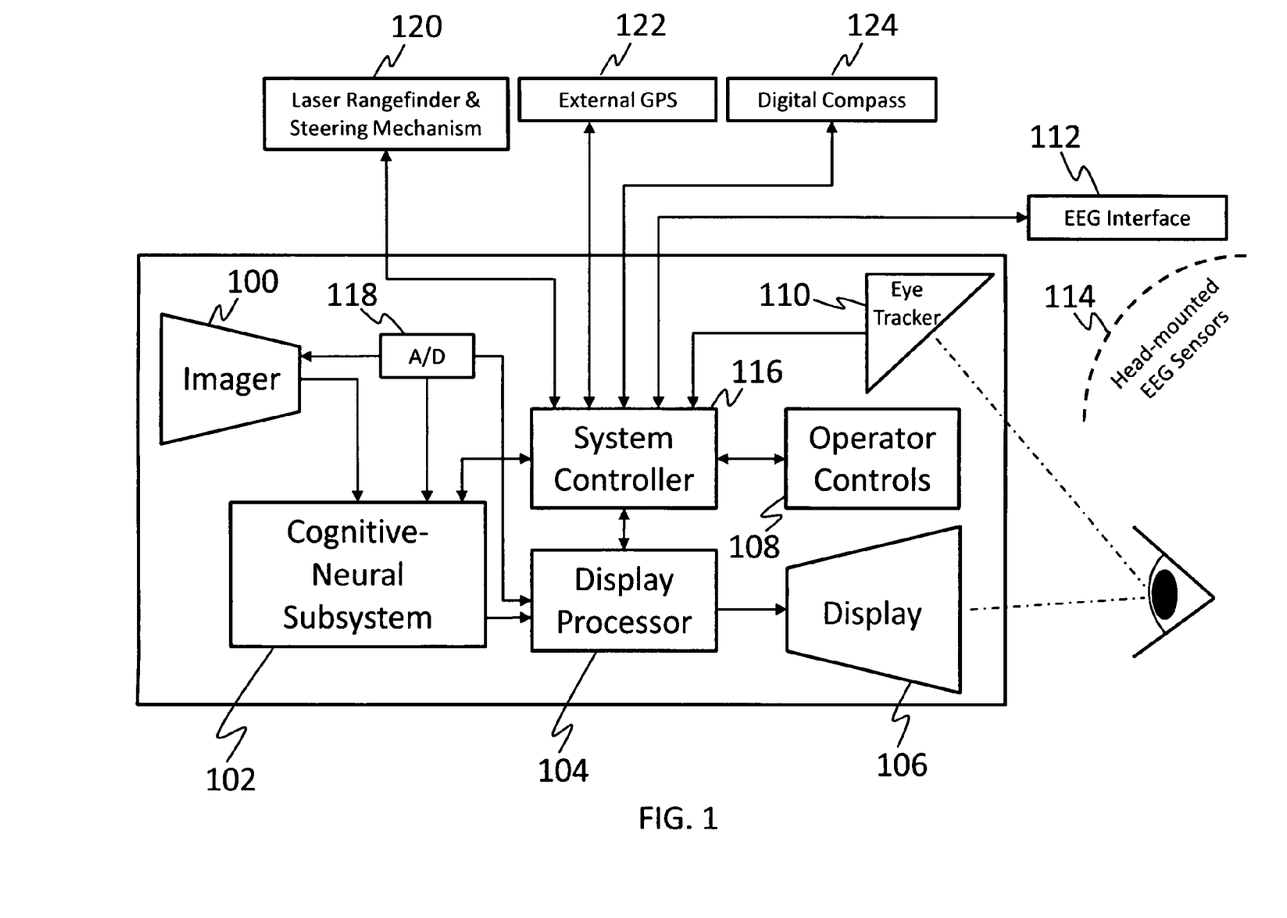
FIG. 1 is a block diagram showing the components of the system of the present invention.

The present invention relates to searching visual imagery and, more specifically to a system for intelligent goal-directed search in large volume visual imagery using a cognitive-neural subsystem. FIG. 1 is a diagram showing the components of the system of the present invention. As shown, the system includes an imager 100 that is used to produce an image of a scene. The imager 100 can comprise a single imager or an array of imagers. The imager 100 can further comprise sensors and optics used in the art to capture image types from a variety of fields of view and electromagnetic ranges. A desired embodiment uses an array of high-resolution imagers, optionally overlapped in an array over a wide field of view, and operates over the visible spectrum. The system may also incorporate imagers which operate in the short-wave and long-wave infrared spectral range. Also, a pre-stored dataset of images may be substituted for the images produced by the imager. The imager 100 sends captured image data to a cognitive-neural subsystem 102 for detecting regions of interest in the imagery. The cognitive-neural subsystem 102 is described in greater detail below with reference to FIG. 2, and is the subject of U.S. patent application Ser. No. 12/316,779, filed Dec. 16, 2008, entitled "COGNITIVE-NEURAL METHOD FOR IMAGE ANALYSIS," which is incorporated by reference as though fully set forth herein.

The cognitive-neural subsystem 102 routes the imagery to a display processor 104. The display processor 104 assembles the image and controls the zoom factor and appearance of the output imagery that an operator sees on a display 106. The display processor 104 also provides image stabilization on reduced resolution imagery. Furthermore, the display processor 104 acts as a general purpose processor for processing image data provided by the various subsystems of the device, such as performing internal manipulations of prioritized lists of regions of interest in the image. The display 106 may comprise any of a variety of display types known in the art, including but not limited to micro, head-worn, handheld, desktop, large screen, or direct-view displays. In a desired embodiment, the entire system is mounted in a pair of head-worn binoculars.

Operator controls 108, including an eye-tracking unit 110, enable the user to choose from a variety of operating modes as well as training and adaptation modes. The eye tracker 110 is a special form of operator control for use with certain operational modes described later in this description. The eye tracker 110 can be used in conjunction with electroencephalography (EEG) data obtained from an EEG interface 112 with the operator's brain via head-mounted EEG sensors 114. The operator controls 108 can also include more standard controls, non-limiting examples of which include a mouse, trackball, and touch-screen.

The system has a system controller 116 configured to control system states and power usage. The system controller 116 also manages interfaces between the imager 100, display 106, display processor 104, cognitive-neural subsystem 102, and operator controls 108. An A/D unit 118 converts an analog signal from the imager 100 into a digital form for use within the other system modules. Additionally, the system controller 116 can accommodate navigational devices such as, but not limited to a laser rangefinder and steering mechanism 120, an external GPS device 122, and a digital compass 124.

Figure 2:
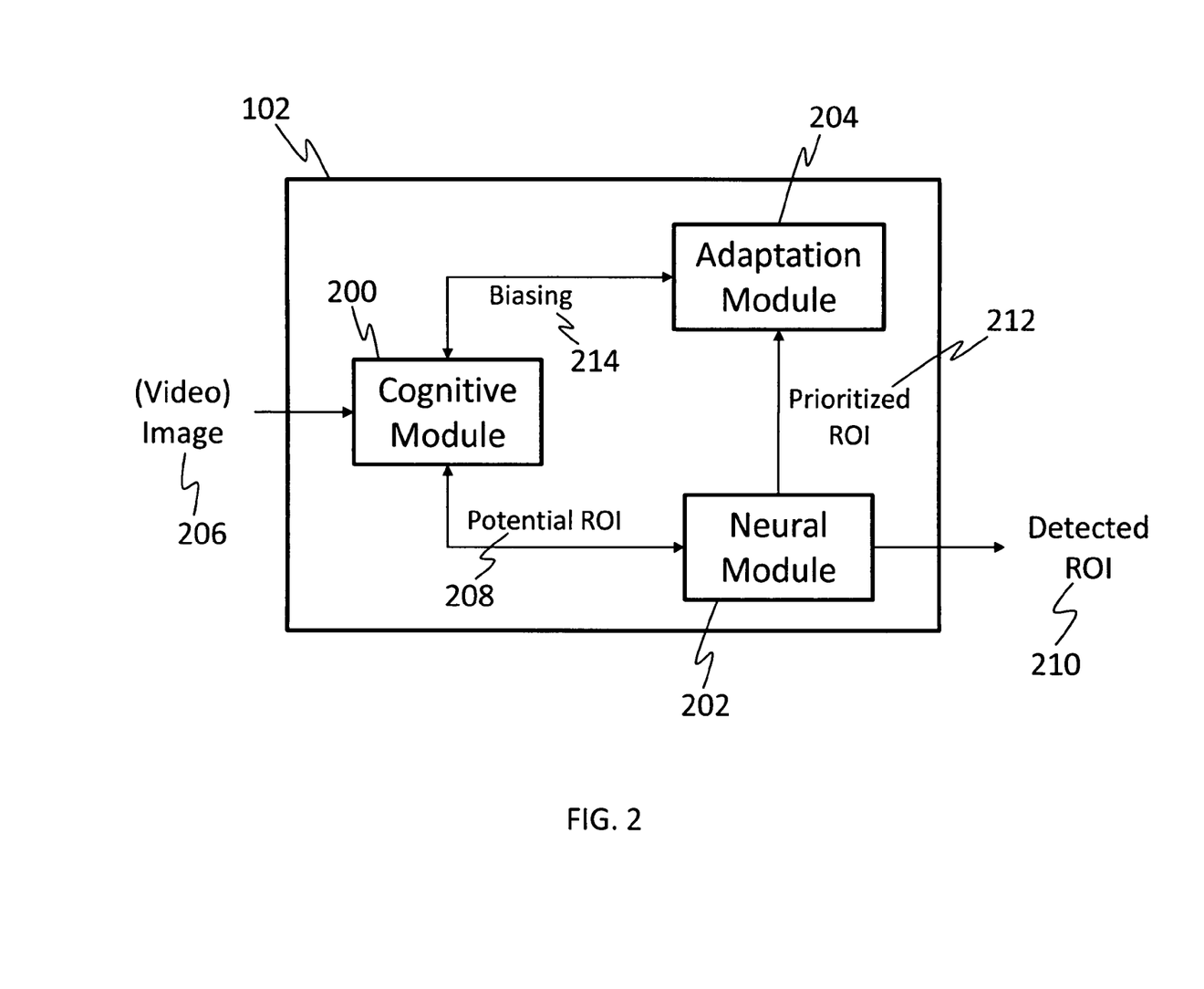
FIG. 2 is a block diagram showing the various modules which comprise the cognitive-neural subsystem of the present invention.

FIG. 2 is a block diagram showing the various modules that comprise the cognitive-neural subsystem 102 of the present invention. The cognitive-neural subsystem 102 comprises three primary modules, a cognitive module 200, a neural module 202, and an adaptation module 204. The cognitive module automatically extracts regions of interest (ROI) from an image 206 or sequence of images using at least one cognitive algorithm such as, but not limited to saliency, surprise, motion, and/or other attention cues. The cognitive module 200 outputs a set of potential ROI 208 to the neural module 202. The neural module 202 refines the set of potential ROI 208 using a neural processing algorithm. Non-limiting examples of neural processing algorithms suitable for use with the system of the present invention are Rapid Serial Visual Presentation (RSVP), real-time eye-tracked electroencephalography (EEG), and presenting the set of potential ROI 208 to an operator for operator-controlled visual inspection and validation. The neural module 202 outputs the refined set of ROI as detected ROI 210, which can either be highlighted on a display, sent to auxiliary processing units for further analysis, or stored for future reference. The neural module 202 can also output the refined set of ROI as a list of prioritized ROI 212 to the adaptation module 204. The adaptation module 204 uses the prioritized ROI 212 from the neural module 202 to bias 214 the one or more cognitive algorithms of the cognitive module 200 based on performance of locating ROI that were of interest to the operator as confirmed by neural analysis. The adaptation module 204 educates the cognitive module 200 so that it can present more relevant potential ROI 208 to the neural module 202 in future searches.

(3) MODES OF OPERATION

Figure 3:
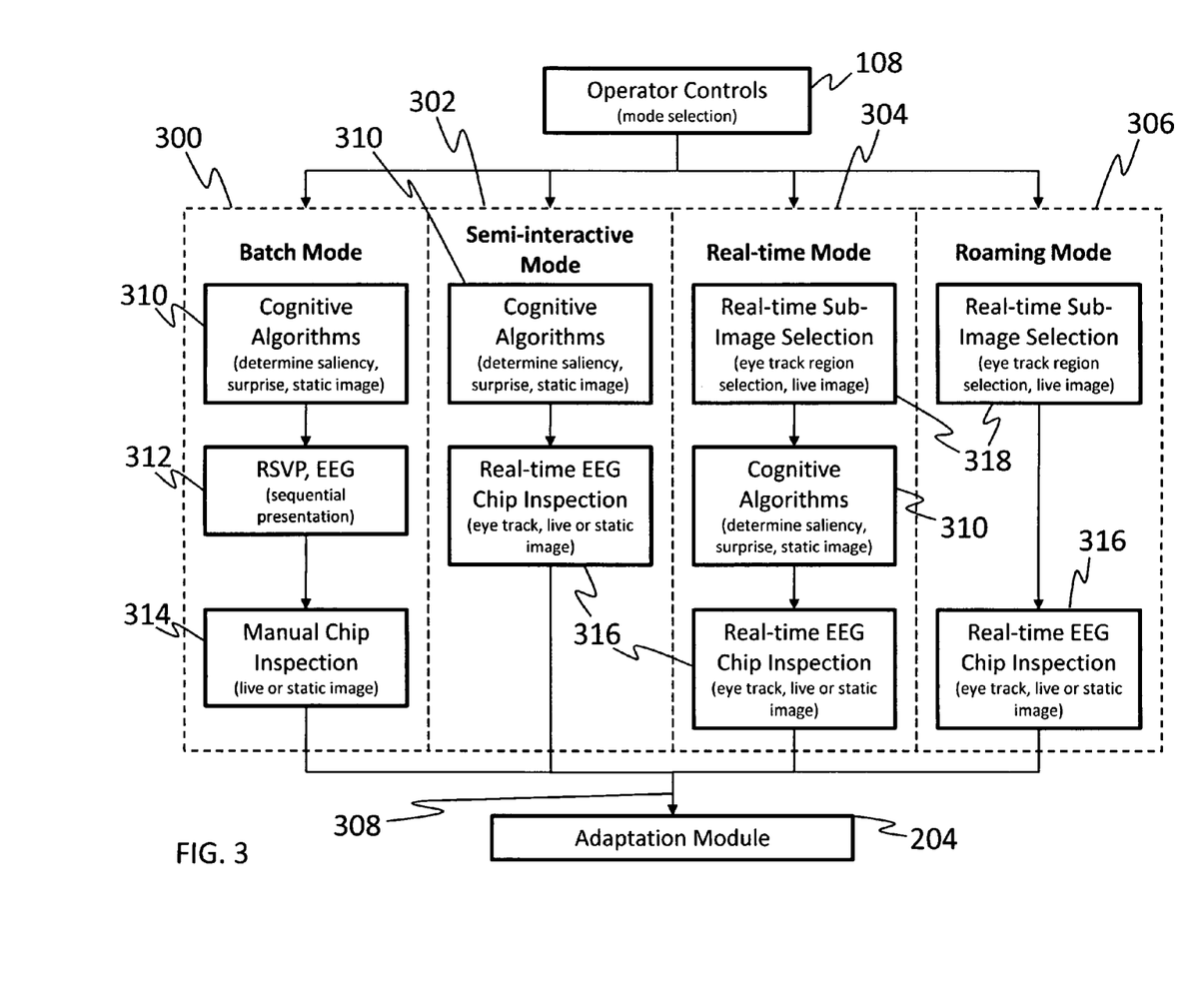
FIG. 3 is a flow diagram of the primary modes of operation of the system of the present invention.

FIG. 3 is a flow diagram illustrating the various modes of operation of the system of the present invention. The system has four primary modes of operation: (3.1) batch mode 300; (3.2) semi-interactive mode 302; (3.3) real-time mode 304; and (3.4) roaming mode 306. The mode of operation can be selected via the operator controls 108. An output 308 from each mode can be sent to the adaptation module 204 for biasing of the cognitive algorithms 310 for future searches.

(3.1) Batch Mode 300

In batch mode 300, the cognitive module pre-selects a portion of an image containing a potential region of interest using a cognitive algorithm 310. The pre-selected image portion may be a single image portion or one of a plurality of image portions from the image being analyzed. The system can also process a sequence of image portions as in the case of live video imagery. The pre-selected image portion is then displayed to an operator using Rapid Serial Visual Presentation (RSVP) 312, and for each image portion displayed via RSVP, an electro-encephalography (EEG) 312 reading is taken to measure the operator's neural response to the image portion. For background regarding RSVP theory and practice, see [1] and [2] in List of Cited References section, above. Each EEG response is classified using a learning classification algorithm. The output score from this algorithm ranges typically between 0-1, for the responses of interest (e.g., an item of interest or No Item of interest). High classification scores indicate a high likelihood of belonging to that class and vice versa. This is a common practice in all classifiers and a threshold can be chosen to achieve a desired trade-off between true detections and false alarms to generate traditional ROC (Receiver Operating Characteristics) performance curves. When an image portion yields a high EEG response, the image portion is presented to the operator for manual inspection and validation 314. The image portions may be presented to the operator serially, or as outlined regions within the full image, in which case the operator can select portions to view in greater detail discretionally. The validated image portions can then be output 308 to the adaptation module 204 where algorithms determine the type of object and bias the parameters of the cognitive algorithms 310 to improve performance in future use. Conventional algorithms for object classification can be used to determine the type of the object. Given an object in an image chip, algorithms using particle swarm technology as described in [3] and [4], can be used to classify the object.

(3.2) Semi-interactive Mode 302

In semi-interactive mode 302, the cognitive module pre-selects portions of the image containing potential regions of interest using a cognitive algorithm 310. As with batch mode (above), the pre-selected image portion may be a single image portion or one of a plurality of image portions to be analyzed. The system can also process a sequence of image portions as in the case of live video imagery. The operator then performs real-time EEG image chip inspection 316, where the operator is presented with a reduced-resolution image with the pre-selected portions of the image highlighted. The operator's gaze is tracked using eye tracking, such that when the operator's gaze crosses the pre-selected portion of the image, the portion is displayed in a full-resolution view for visual inspection by the operator. The operator's neural response to the pre-selected image portions is measured using EEG readings. Image portions which trigger a high EEG response are validated as ROI. The validated image portions can then be output 308 to the adaptation module 204 where algorithms determine the type of object and bias the parameters of the cognitive algorithms 310 to improve performance in future use. Non-limiting examples of parameters of the cognitive algorithms include intensity, color and contrast sensitivity, local gradient measures, and motion sensitivity. The semi-interactive mode 302 can be used in conjunction with the RSVP functions of the batch mode 300 if desired.

(3.3) Real-time Mode 304

In real-time mode 304, the operator first performs real-time sub-image selection 318. For real-time sub-image selection 318, the operator is presented with real-time images for visual inspection. The real-time images can be analyzed as a temporal sequence of individual image frames. In a desired embodiment the operator initially views a reduced-resolution view of the image stream. The operator's gaze is tracked using eye-tracking, and portions of the image are extracted based on the location of the operator's gaze. The extracted portions are processed by a cognitive algorithm 310 to identify whether the image portion contains a potential ROI. Processing by the cognitive algorithm 310 can occur in real-time. The cognitive algorithms send the image coordinates of the image chips that contain potential ROI's at full resolution to the system controller 116. The system controller sequences through each potential ROI, causing the display processor 104 to zoom in on the ROI in the image. This occurs rapidly and seamlessly so the operator knows exactly where in the image chip an ROI may exist. The extracted portions containing potential ROI are then presented to the operator for real-time EEG chip inspection 316, where the operator's response to each image portion is measured with EEG readings. Those image portions which trigger high EEG response are marked and stored for later validation. The image chips can then later be presented to the operator for operator-controlled visual inspection and validation. The validated image portions can then be output 308 to the adaptation module 204 where algorithms determine the type of object and bias the parameters of the cognitive algorithms 310 to improve performance in future use.

(3.4) Roaming Mode 306

In roaming mode 306, the operator first performs real-time sub-image selection 318. For real-time sub-image selection 318, the operator is presented with real-time images for visual inspection. The operator's gaze is tracked using eye-tracking, and portions of the image are extracted based on the location of the operator's gaze. The extracted portions containing potential ROI are then presented to the operator for real-time EEG chip inspection 316, where the operator's response to each image portion is measured with EEG readings. Those image portions which trigger high EEG response are marked and stored for later validation. The image chips can then later be presented to the operator for operator-controlled visual inspection and validation. The validated image portions can then be output 308 to the adaptation module 204 where algorithms determine the type of object and bias the parameters of the cognitive algorithms 310 to improve performance in future use. As previously mentioned, the cognitive-neural subsystem including the adaptation module is the subject related U.S. patent application Ser. No. 12/316,779.

(4) MISCELLANEOUS FUNCTIONALITIES

In many of the above modes, the user can search the imagery or video using a coarse-to-fine resolution strategy, and the system provides intelligent inspection and zooming advice continuously. The user operates as though they have a manual point-and-zoom device while eye tracking or other ROI selection means determines the user's gaze location on the image. Cognitive algorithms process at higher levels of resolution, ahead of the user, to find potential ROI's around the current gaze location. These potential ROI's effectively cue the user to search specific image regions with a higher probability of containing ROI's at increased resolution but is not visible at sufficient resolution on the display to enable the user to detect them. Neural classification of the contents of each image visible to the user enables relevant ROI's to be stored at any stage.

The user can choose from either a continuous zoom or discrete zoom method. Continuous zoom uses an image location determined by gaze or pointer to initialize the image rectangle to display at the maximum resolution of the display screen. Given a zoom rate, the system grabs a slightly smaller region of the current displayed image at the next level of higher resolution, and sub-samples it to fit the image onto the display. The user's gaze direction or input from the cognitive module (e.g., a potential region of interest) determines the center of this region as described above. This process repeats until the user decides to back out of the zoom or indicates completion (e.g., through a button press). At each stage of the zoom, an image chip from the central region of the user's gaze is available for neural processing. A discrete zoom system, which uses a preset number of image resolutions to choose from, can also be used with the present invention.

Figure 4:
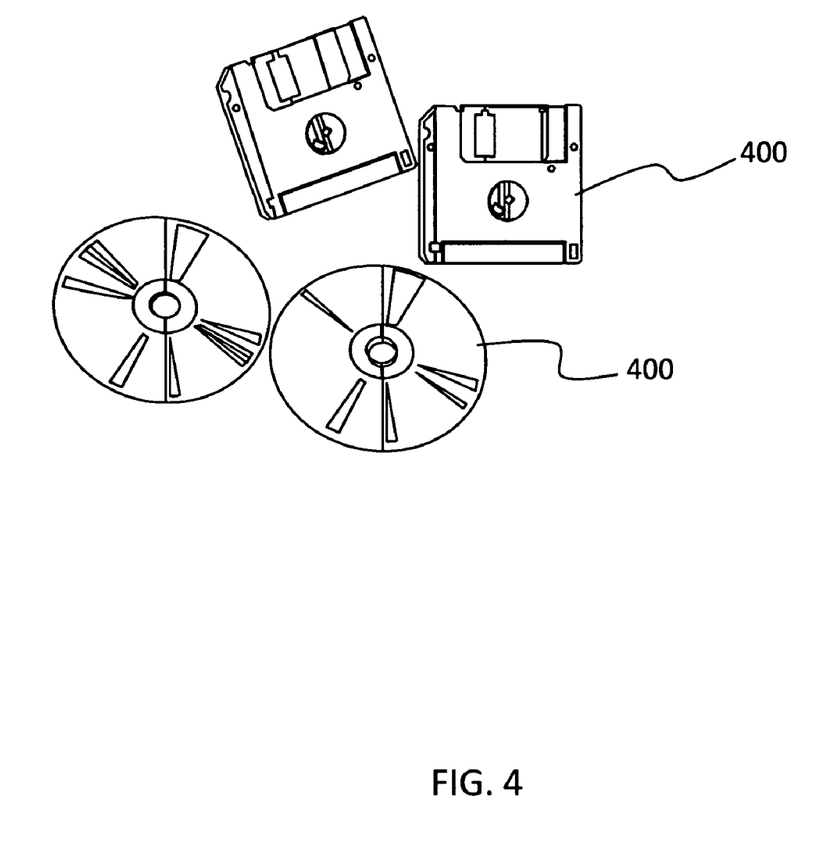
FIG. 4 is an illustration showing examples of computer program products in accordance with the present invention.

An illustrative diagram of a computer program product embodying the present invention is depicted in FIG. 4. The computer program product 400 is depicted as an optical disk such as a CD or DVD. However, the computer program product generally represents computer-readable instruction means stored on any compatible computer-readable medium. The term "instruction means" as used with respect to this invention generally indicates a set of operations to be performed on a computer having one or more processors, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. The computer program product 400 of the present invention comprises computer readable instructions for operating a system for intelligent goal directed search in large volume video imagery as fully described in the above specification. More specifically, the computer program product 400 comprises computer-readable instructions stored on a computer readable medium executable by a computer having a processor for causing the processor to perform operations of: receiving image data of a scene; assembling the image and controlling an appearance of the image as seen by an operator on a display; receiving input from operator controls configured to allow the operator to select from one or more operating modes and to navigate the displayed image; and locating regions of interest in the image by extracting a set of regions of interest from the image using a cognitive algorithm and refining the set of regions of interest using a neural processing algorithm to produce a prioritized set of regions of interest, and to further process the regions of interest depending on the selected operating mode. The computer program product 400 further comprises instructions to operate in one or more operating modes of the present invention, selected from a group consisting of a batch mode, a semi-interactive mode, a real-time mode, and a roaming mode. Finally, the computer program product 400 further comprises instructions to perform an operation of biasing the cognitive algorithm based on information gained from the neural processing algorithm.

What is claimed is:

1. A system for intelligent goal-directed search in large volume imagery and video, comprising:
   an imager configured to produce an image of a scene;
   a display for displaying the image to an operator;
   a display processor configured to assemble the image and control an appearance of the image as seen by the operator on the display;
   operator controls configured to allow the operator to select from one or more operating modes and to navigate the image as seen on the display;
   a cognitive-neural subsystem configured to locate regions of interest in the image, the cognitive-neural subsystem comprising:
      a cognitive module configured to extract a set of regions of interest from the image using a cognitive algorithm; and
      a neural module Configured to refine the set of regions of interest using a neural processing algorithm to produce a prioritized set of regions of interest;
   wherein the system is configured to operate in one or more operating modes selected from a group consisting of a batch mode, a semi-interactive mode, a real-time mode, and a roaming mode;
   wherein the cognitive neural subsystem further comprises an adaptation module configured to bias the cognitive algorithm based on information gained from the neural processing algorithm;
wherein when operating in batch mode, the system is configured to:
   pre-select a portion of an image containing a potential region of interest using the cognitive algorithm;
   display the pre-selected portion of the image to the operator using Rapid Serial Visual Presentation (RSVP);
   measure an operator response to the pre-selected portion of the image using Electro-encephalography (EEG);
   when the pre-selected portion of the image yields a high EEG response, present the portion to the operator for operator-controlled visual inspection and validation; and
   when the pre-selected portion of the image was validated by the operator, bias the cognitive algorithm based on the pre-selected portion of the image validated by the operator, whereby the performance of the cognitive algorithm is improved in future searches.

2. A system for intelligent goal-directed search in large volume imagery and video, comprising:
   an imager configured to produce an image of a scene;
   a display for displaying the image to an operator;
   a display processor configured to assemble the image and control an appearance of the image as seen by the operator on the display;
   operator controls configured to allow the operator to select from one or more operating modes and to navigate the image as seen on the display;
   a cognitive-neural subsystem configured to locate regions of interest in the image, the cognitive-neural subsystem comprising:
      a cognitive module configured to extract a set of regions of interest from the image using a cognitive algorithm; and
      a neural module configured to refine the set of regions of interest using a neural processing algorithm to produce a prioritized set of regions of interest;
   wherein the system is configured to operate in one or more operating modes selected from a group consisting of a batch mode, a semi-interactive mode, a real-time mode, and a roaming mode;
   wherein the cognitive neural subsystem further comprises an adaptation module configured to bias the cognitive algorithm based on information gained from the neural processing algorithm:
wherein when operating in semi-interactive mode, the system is configured to:
   pre-select a portion of an image containing a potential region of interest using the cognitive algorithm;
   present the user with a reduced-resolution image where the pre-selected portion of the image is highlighted;
   track a gaze of the operator using eye-tracking, such that when the operator's gaze crosses the pre-selected portion of the image, the portion is displayed in a full resolution view for visual inspection by the operator;
   measure an operator response to the pre-selected portion of the image using Electro-encephalography (EEG);
   validate the pre-selected portion of the image if it triggers a high LEG response; and
   when the pre-selected image portion was validated, bias the cognitive algorithm based on the pre-selected portion of the image validated by the operator, whereby the performance of the cognitive algorithm is improved in future searches.

3. A system for intelligent goal-directed search in large volume imagery and video, comprising:
   an imager configured to produce an image of a scene;
   a display for displaying the image to an operator;
   a display processor configured to assemble the image and control an appearance of the image as seen by the operator on the display;
   operator controls configured to allow the operator to select from one or more operating modes and to navigate the image as seen on the display;
   a cognitive-neural subsystem configured to locate regions of interest in the image, the cognitive-neural subsystem comprising:
      a cognitive module configured to extract a set of regions of interest from the image using a cognitive algorithm; and
      a neural module configured to refine the set of regions of interest using a neural processing algorithm to produce a prioritized set of regions of interest;
   wherein the system is configured to operate in one or more operating modes selected from a group consisting of a batch mode, a semi-interactive mode, a real-time mode, and a roaming mode;
   wherein the cognitive neural subsystem further comprises an adaptation module configured to bias the cognitive algorithm based on information gained from the neural processing algorithm;
wherein when operating in real-time mode, the system is configured to:
   present the operator with an image for visual inspection;
   track a gaze of the operator using eye-tracking;

extract a portion of the image based on the location of the operator's gaze;

process the extracted portion of the image using the cognitive algorithm to identify whether the portion contains a potential region of interest;

present the extracted portion of the image containing a potential regions of interest to the operator for visual inspection;

measure an operator response to the extracted portion of the image using Electro-encephalography (EEG);

when the extracted portion of the image triggers a high EEG response, mark and store the portion for later validation;

present the stored portion of the image to the operator for operator-controlled visual inspection and validation; and when the image portion is validated by the operator, bias the cognitive algorithm based on the validated portion of the image, whereby the performance of the cognitive algorithm is improved in future searches.

4. A system for intelligent goal-directed search in large volume imagery and video, comprising:

an imager configured to produce an image of a scene;

a display for displaying the image to an operator;

a display processor configured to assemble the image and control an appearance of the image as seen by the operator on the display;

operator controls configured to allow the operator to select from one or more operating modes and to navigate the image as seen on the display;

a cognitive-neural subsystem configured to locate regions of interest in the image, the cognitive-neural subsystem comprising:

a cognitive module configured to extract a set of regions of interest from the image using a cognitive algorithm; and a neural module configured to refine the set of regions of interest using a neural processing algorithm to produce a prioritized set of regions of interest;

wherein the system is configured to operate in one or more operating modes selected from a group consisting of a batch mode, a semi-interactive mode, a real-time mode, and a roaming mode;

wherein the cognitive neural subsystem further comprises an adaptation module configured to bias the cognitive algorithm based on information gained from the neural processing algorithm;

wherein when operating in roaming mode, the system is configured to:

present the operator with an image for visual inspection;

track a gaze of the operator using eye-tracking;

extract a portion of the image based on the location of the operator's gaze;

measure an operator response to the extracted portion of the image using Electro-encephalography (EEG);

when the portion of the image triggers a high EEG response, mark and store the portion for later validation;

present the stored portion of the image to the operator for operator-controlled visual inspection and validation; and when the portion of the image is validated by the operator, bias the cognitive algorithm based on the validated portion of the image, whereby the performance of the cognitive algorithm is improved in future searches.

5. A system for intelligent goal-directed search in large volume imagery and video, comprising:

an imager configured to produce an image of a scene;

a display for displaying the image to an operator;

a display processor configured to assemble the image and control an appearance of the image as seen by the operator on the display;

operator controls configured to allow the operator to select from one or more operating modes and to navigate the image as seen on the display;

a cognitive-neural subsystem configured to locate regions of interest in the image, the cognitive-neural subsystem comprising:

a cognitive module configured to extract a set of regions of interest from the image using a cognitive algorithm; and a neural module configured to refine the set of regions of interest using a neural processing algorithm to produce a prioritized set of regions of interest;

wherein the system is configured to operate in one or more operating modes selected from a group consisting of a batch mode, a semi-interactive mode a real-time mode, and a roaming mode;

wherein when operating in batch mode, the system is configured to:

pre-select a portion of an image containing a potential region of interest using the cognitive algorithm;

display the pre-selected portion of the image to the operator using Rapid Serial Visual Presentation (RSVP);

measure an operator response to the pre-selected portion of the image using Electro-encephalography (EEG); and when the pre-selected portion of the image yields a high EEG response, present the portion to the operator for operator-controlled visual inspection and validation.

6. A system for intelligent goal-directed search in large volume imagery and video, comprising:

an imager configured to produce an image of a scene;

a display for displaying the image to an operator;

a display processor configured to assemble the image and control an appearance of the image as seen by the operator on the display;

operator controls configured to allow the operator to select from one or more operating modes and to navigate the image as seen on the display;

a cognitive-neural subsystem configured to locate regions of interest in the image, the cognitive-neural subsystem comprising:

a cognitive module configured to extract a set of regions of interest from the image using a cognitive algorithm; and a neural module configured to refine the set of regions of interest using a neural processing algorithm to produce a prioritized set of regions of interest;

wherein the system is configured to operate in one or more operating modes selected from a group consisting of a batch mode, a semi-interactive mode, a real-time mode, and a roaming mode;

wherein when operating in semi-interactive mode, the system is configured to:

pre-select a portion of an image containing a potential region of interest using the cognitive algorithm;

present the user with a reduced-resolution image where the pre-selected portion of the image is highlighted;

track a gaze of the operator using eye-tracking, such that when the operator's gaze crosses the pre-selected portion of the image, the portion is displayed in a full resolution view for visual inspection by the operator;

measure an operator response to the pre-selected portion of the image using Electro-encephalography (EEG); and validate the pre-selected portion of the image if it triggers a high EEG response.

7. A system for intelligent coal-directed search in large volume imagery and video, comprising:
an imager configured to produce an image of a scene;
a display for displaying the image to an operator;
a display processor configured to assemble the image and control an appearance of the image as seen by the operator on the display;
operator controls configured to allow the operator to select from one or more operating modes and to navigate the image as seen on the display;
a cognitive-neural subsystem configured to locate regions of interest in the image, the cognitive-neural subsystem comprising:
a cognitive module configured to extract a set of regions of interest from the image using, a cognitive algorithm; and
a neural module configured to refine the set of regions of interest using a neural processing algorithm to produce a prioritized set of regions of interest,
wherein the system is configured to operate in one or more operating modes selected from a group consisting of a batch mode, a semi-interactive mode a real-time mode, and a roaming mode;
wherein when operating in real-time mode, the system is configured to:
present the operator with an image for visual inspection;
track a gaze of the operator using eye-tracking;
extract a portion of the image based on the location of the operator's gaze;
process the extracted portion of the image using the cognitive algorithm to identify whether the portion contains a potential region of interest;
present the extracted portion of the image containing a potential regions of interest to the operator for visual inspection;
measure an operator response to the extracted portion of the image using Electro-encephalography (EEG);
when the extracted portion of the image triggers a high EEG response, mark and store the portion for later validation; and
present the stored portion of the image to the operator for operator-controlled visual inspection and validation.

8. A system for intelligent coal-directed search in large volume imagery and video, comprising:
an imager configured to produce an image of a scene;
a display for displaying the image to an operator;
a display processor configured to assemble the image and control an appearance of the image as seen by the operator on the display;
operator controls configured to allow the operator to select from one or more operating modes and to navigate the image as seen on the display;
a cognitive-neural subsystem configured to locate regions of interest in the image, the cognitive-neural subsystem comprising:
a cognitive module configured to extract a set of regions of interest from the image using a cognitive algorithm; and
a neural module configured to refine the set of regions of interest using a neural processing algorithm to produce a prioritized set of regions of interest;
wherein the system is configured to operate in one or more operating modes selected from a group consisting of a batch mode, a semi-interactive mode, a real-time mode, and a roaming mode;
wherein when operating in roaming mode, the system is configured to:
present the operator with an image for visual inspection;
track a gaze of the operator using eye-tracking;
extract a portion of the image based on the location of the operator's gaze;
measure an operator response to the extracted portion of the image using Electro-encephalography (EEG);
when the portion of the image triggers a high EEG response, mark and store the portion for later validation; and
present the stored portion of the image to the operator for operator-controlled visual inspection and validation.

9. A system for intelligent goal-directed search in large volume imagery and video; comprising:
an imager configured to produce an image of a scene;
a display for displaying the image to an operator;
a display processor configured to assemble the image and control an appearance of the image as seen by the operator on the display;
operator controls configured to allow the operator to select from one or more operating modes and to navigate the image as seen on the display;
a cognitive-neural subsystem configured to locate regions of interest in the image, the cognitive-neural subsystem comprising:
a cognitive module configured to extract a set of regions of interest from the image using a cognitive algorithm; and
a neural module configured to refine the set of regions of interest using a neural processing algorithm to produce a prioritized set of regions of interest; and
further comprising one or more navigational components selected from the group consisting of a laser rangefinder and steering mechanism, an external GPS device, and a digital compass.

10. A system for intelligent goal-directed search in large volume imagery and video, comprising:
an imager configured to produce an image of a scene;
a display for displaying the image to an operator;
a display processor configured to assemble the image and control an appearance of the image as seen by the operator on the display;
operator controls configured to allow the operator to select from one or more operating modes and to navigate the image as seen on the display;
a cognitive-neural subsystem configured to locate regions of interest in the image, the cognitive-neural subsystem comprising:
a cognitive module configured to extract a set of regions of interest from the image using a cognitive algorithm; and
a neural module configured to refine the set of regions of interest using a neural processing algorithm to produce a prioritized set of regions of interest; and
wherein the system is mounted in a pair of binoculars.

11. A computer program product for intelligent goal-directed search in large volume imagery and video, comprising computer readable instruction means stored on a non-transitory computer readable medium that are executable by a computer having a processor for causing the processor to perform operations of:
receiving image data of a scene;
assembling the image and controlling an appearance of the image as seen by an operator on a display;

receiving input from operator controls configured to allow the operator to select from one or more operating modes and to navigate the image as seen on the display;
locating regions of interest in the image by:
extracting a set of regions of interest from the image using a cognitive algorithm; and
refining the set of regions of interest using a neural processing algorithm to produce a prioritized set of regions of interest; and
further comprising instruction means to cause the processor to operate in one or more operating modes selected from a group consisting of a batch mode, a semi-interactive mode, a real-time mode, and a roaming mode;
further comprising instruction means to cause the processor to perform an operation of biasing, the cognitive algorithm based on information gained from the neural processing algorithm;
further comprising instruction means for causing the processor, when operating in batch mode, to perform operations of:
pre-selecting a portion of an image containing a potential region of interest using the cognitive algorithm;
displaying the pre-selected portion of the image to the operator using Rapid Serial Visual Presentation (RSVP);
measuring an operator response to the pre-selected portion of the image using Electro-encephalography (EEG);
when the pre-selected portion of the image yields a high EEG response, presenting the portion to the operator via the display for operator-controlled visual inspection and validation; and
when the pre-selected portion of the image was validated by the operator, biasing the cognitive algorithm based on the pre-selected portion of the image validated by the operator, whereby the performance of the cognitive algorithm is improved in future searches.

12. A computer program product for intelligent goal-directed search in large volume imagery and video, comprising computer readable instruction means stored on a non-transitory computer readable medium that are executable by a computer having a processor for causing the processor to perform operations of:
receiving image data of a scene;
assembling the image and controlling an appearance of the image as seen by an operator on a display;
receiving input from operator controls configured to allow the operator to select from one or more operating modes and to navigate the image as seen on the display;
locating regions of interest in the image by:
extracting a set of regions of interest from the image using a cognitive algorithm; and
refining the set of regions of interest using a neural processing algorithm to produce a prioritized set of regions of interest; and
further comprising instruction means to cause the processor to operate in one or more operating modes selected from a group consisting of a batch mode, a semi-interactive mode, a real-time mode, and a roaming mode;
further comprising instruction means to cause the processor to perform an operation of biasing the cognitive algorithm based on information gained from the neural processing algorithm;
further comprising instruction means for causing the processor, when operating in semi-interactive mode, to perform operations of:
pre-selecting a portion of an image containing a potential region of interest using the cognitive algorithm;
presenting the user with a reduced-resolution image where the pre-selected portion of the image is highlighted;
tracking a gaze of the operator using eye-tracking, such that when the operator's gaze crosses the pre-selected portion of the image, the portion is displayed in a full resolution view for visual inspection by the operator;
measuring an operator response to the pre-selected portion of the image using Electro-encephalography (EEG);
validating the pre-selected portion of the image if it triggers a high EEG response; and
when the pre-selected image portion was validated, biasing the cognitive algorithm based on the pre-selected portion of the image validated by the operator, whereby the performance of the cognitive algorithm is improved in future searches.

13. A computer program product for intelligent goal-directed search in large volume imagery and video, comprising computer readable instruction means stored on a non-transitory computer readable medium that are executable by a computer having a processor for causing the processor to perform operations of:
receiving image data of a scene;
assembling the image and controlling an appearance of the image as seen by an operator on a display;
receiving input from operator controls configured to allow the operator to select from one or more operating modes and to navigate the image as seen on the display;
locating regions of interest in the image by:
extracting a set of regions of interest from the image using a cognitive algorithm; and
refining the set of regions of interest using a neural processing algorithm to produce a prioritized set of regions of interest; and
further comprising instruction means to cause the processor to operate in one or more operating modes selected from a group consisting of a hatch mode, a semi-interactive mode, a real-time mode, and a roaming mode;
further comprising instruction means to cause the processor to perform an operation of biasing the cognitive algorithm based on information gained from the neural processing algorithm;
further comprising instruction means for causing the processor, when operating in real-time mode, to perform operations of:
presenting the operator with an image for visual inspection;
tracking a gaze of the operator using eye-tracking;
extracting a portion of the image based on the location of the operator's gaze;
processing the extracted portion of the image using the cognitive algorithm to identify whether the portion contains a potential region of interest;
presenting the extracted portion of the image containing a potential regions of interest to the operator for visual inspection;
measuring an operator response to the extracted portion of the image using Electro-encephalography (EEG);
when the extracted portion of the image triggers a high EEG response, marking and storing the portion for later validation;
presenting the stored portion of the image to the operator for operator-controlled visual inspection and validation; and
when the image portion is validated by the operator, biasing the cognitive algorithm based on the validated portion of the image, whereby the performance of the cognitive algorithm is improved in future searches.

14. A computer program product for intelligent goal-directed search in lame volume imagery and video, comprising computer readable instruction means stored on a non-transitory computer readable medium that are executable by a computer having a processor for causing the processor to perform operations of:
  receiving image data of a scene;
  assembling the image and controlling an appearance of the Mine as seen by an operator on a display;
  receiving input from operator controls configured to allow the operator to select from one or more operating modes and to navigate the image as seen on the display;
  locating regions of interest in the image by:
    extracting a set of regions of interest from the image using a cognitive algorithm; and
    refining the set of regions of interest using a neural processing algorithm to produce a prioritized set of regions of interest; and
  further comprising instruction means to cause the processor to operate in one or more operating modes selected from a group consisting of a batch mode, a semi-interactive mode, a real-time mode, and a roaming mode;
  further comprising instruction means to cause the processor to perform an operation of biasing the cognitive algorithm based on information gained from the neural processing algorithm;
  further comprising instruction means for causing the processor, when operating in roaming mode, to perform operations of:
  presenting the operator with an image for visual inspection;
  tracking a gaze of the operator using eye-tracking;
  extracting a portion of the image based on the location of the operator's gaze;
  measuring an operator response to the extracted portion of the image using Electro-encephalography (EEG);
  when the portion of the image triggers a high EEG response, marking and storing the portion for later validation;
  presenting the stored portion of the image to the operator for operator-controlled visual inspection and validation; and
  when the portion of the image is validated by the operator, biasing the cognitive algorithm based on the validated portion of the image, whereby the performance of the cognitive algorithm is improved in future searches.

15. A computer program product for intelligent goal-directed search in large volume imagery and video, comprising computer readable instruction means stored on a non-transitory computer readable medium that are executable by a computer having a processor for causing the processor to perform operations of:
  receiving image data of a scene;
  assembling the image and controlling an appearance of the image as seen by an operator on a display;
  receiving input from operator controls configured to allow the operator to select from one or more operating modes and to navigate the image as seen on the display;
  locating regions of interest in the image by:
    extracting a set of regions of interest from the image using a cognitive algorithm; and
    refining the set of regions of interest using a neural processing algorithm to produce a prioritized set of regions of interest; and
  further comprising instruction means to cause the processor to receive data from one or more navigational components selected from a group consisting of a laser rangefinder and steering mechanism, an external GPS device, and a digital compass.

* * * * *